(12) United States Patent
Mishra et al.

(10) Patent No.: US 12,524,234 B2
(45) Date of Patent: Jan. 13, 2026

(54) SYNCHRONIZATION SYSTEM FOR APPLICATION LIFECYCLE MANAGEMENT

(71) Applicant: Dell Products L.P., Round Rock, TX (US)

(72) Inventors: Abhishek Mishra, Bangalore (IN); Priya Ramaradhya, Bangalore (IN); Anupam Roy, Bangalore (IN); Abhishek Goel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 18/378,924

(22) Filed: Oct. 11, 2023

(65) Prior Publication Data

US 2025/0123840 A1    Apr. 17, 2025

(51) Int. Cl.
*G06F 16/242* (2019.01)
*G06F 8/77* (2018.01)
(Continued)

(52) U.S. Cl.
CPC .............. *G06F 8/77* (2013.01); *G06F 16/254* (2019.01); *G06F 16/27* (2019.01); *G06F 3/0481* (2013.01); *G06F 3/0483* (2013.01); *G06F 9/451* (2018.02); *G06F 9/547* (2013.01); *G06F 16/116* (2019.01); *G06F 16/144* (2019.01); *G06F 16/214* (2019.01); *G06F 16/2272* (2019.01);
(Continued)

(58) Field of Classification Search
CPC ..... G06F 8/77; G06F 8/71; G06F 8/60; G06F 8/36; G06F 8/34; G06F 16/27; G06F 16/254; G06F 16/2428; G06F 16/906; G06F 16/908; G06F 16/214; G06F 16/2272; G06F 16/258; G06F 16/116; G06F 16/144; G06F 16/2308; G06F 9/451; G06F 9/547; G06F 3/0481; G06F 3/0483
See application file for complete search history.

(56) References Cited

U.S. PATENT DOCUMENTS 8,667,330 B1    3/2014 Chatterjee et al.
8,949,183 B2    2/2015 Hildebrand et al.
(Continued)

FOREIGN PATENT DOCUMENTS

TW    I509423 B    11/2015

*Primary Examiner* — Anibal Riveracruz
(74) *Attorney, Agent, or Firm* — Ryan, Mason & Lewis, LLP

(57) ABSTRACT

Methods, apparatus, and processor-readable storage media for implementing synchronization systems for application lifecycle management (ALM) are provided herein. An example computer-implemented method includes identifying ALM tools in conjunction with at least one software application development task; establishing a connection between at least a first and at least a second of the ALM tools using one or more application programming interfaces (APIs) associated with the at least first ALM tool and the at least second ALM tool; determining data mapping rules and data transformation rules associated with the at least first ALM tool and the at least second ALM tool; and synchronizing data, related to the at least one software application development task, from the at least first to the at least second ALM tool, via the connection and in accordance with at least a portion of the data mapping rule(s) and the data transformation rule(s).

20 Claims, 10 Drawing Sheets

(51) Int. Cl.
    *G06F 9/451*     (2018.01)
    *G06F 16/25*     (2019.01)
    *G06F 16/27*     (2019.01)
    *G06F 3/0481*     (2022.01)
    *G06F 3/0483*     (2013.01)
    *G06F 9/54*     (2006.01)
    *G06F 16/11*     (2019.01)
    *G06F 16/14*     (2019.01)
    *G06F 16/21*     (2019.01)
    *G06F 16/22*     (2019.01)
    *G06F 16/23*     (2019.01)
    *G06F 16/906*     (2019.01)
    *G06F 16/908*     (2019.01)

(52) U.S. Cl.
    CPC ...... *G06F 16/2308* (2019.01); *G06F 16/2428* (2019.01); *G06F 16/258* (2019.01); *G06F 16/906* (2019.01); *G06F 16/908* (2019.01)

(56) References Cited

U.S. PATENT DOCUMENTS

| | | | |
|---|---|---|---|
| 11,539,791 B1 * | 12/2022 | Mikolajczuk | G06F 16/2282 |
| 2013/0211569 A1 * | 8/2013 | Cherusseri | G06Q 10/06 |
| | | | 700/97 |
| 2017/0244646 A1 * | 8/2017 | Dyer | H04L 67/55 |
| 2021/0342361 A1 * | 11/2021 | Radzewsky | G06F 16/23 |
| 2021/0342785 A1 * | 11/2021 | Mann | G06Q 10/06316 |
| 2022/0004383 A1 * | 1/2022 | Esponda | G06F 8/77 |
| 2023/0069374 A1 * | 3/2023 | Rosania | G06F 8/70 |
| 2023/0359999 A1 * | 11/2023 | Balu | G06Q 10/103 |
| 2024/0220063 A1 * | 7/2024 | Sutrave | G06F 3/0481 |
| 2024/0330280 A1 * | 10/2024 | Mauritz | G06F 9/451 |

\* cited by examiner

| ALM TOOL-1 | ALM TOOL-2 |
|---|---|
| PENDING PROJECT OBJECT MODEL | NEW |
| PENDING STOCK KEEPING UNIT (SKU)/OPTION CREATION | DEVELOPER ASSIGNED |
| REVIEW | SEND FOR REVIEW |
| SKU/OPTION CREATED | LAUNCH |
| ON HOLD | ON HOLD |
| CANCEL | REJECTED |

| ALM TOOL-1 | ALM TOOL-2 | DEFAULT |
|---|---|---|
| ASIA PACIFIC AND JAPAN (APJ) SKU/OPTION; OR EUROPE, THE MIDDLE EAST AND AFRICA (EMEA) SKU/OPTION | TASK CATEGORY | ITEM CREATE/UPDATE |
| N/A | TASK SUBCATEGORY | |
| SUMMARY | REQUEST TITLE | |
| STATE | STATUS | DEVELOPER ASSIGNED |
| REQUESTOR | REQUESTING GROUP | |
| ROOT CAUSE | REASON FOR CHANGE | |
| DESCRIPTION | DESCRIPTION | |
| PRODUCT BRAND | PRODUCT LINE OF BUSINESS (LOB) | |
| REGIONS AFFECTED | REGION | |
| CATALOG | COUNTRY | |
| | SEGMENT | N/A |
| PILOT DATE | LAUNCH DATE | |

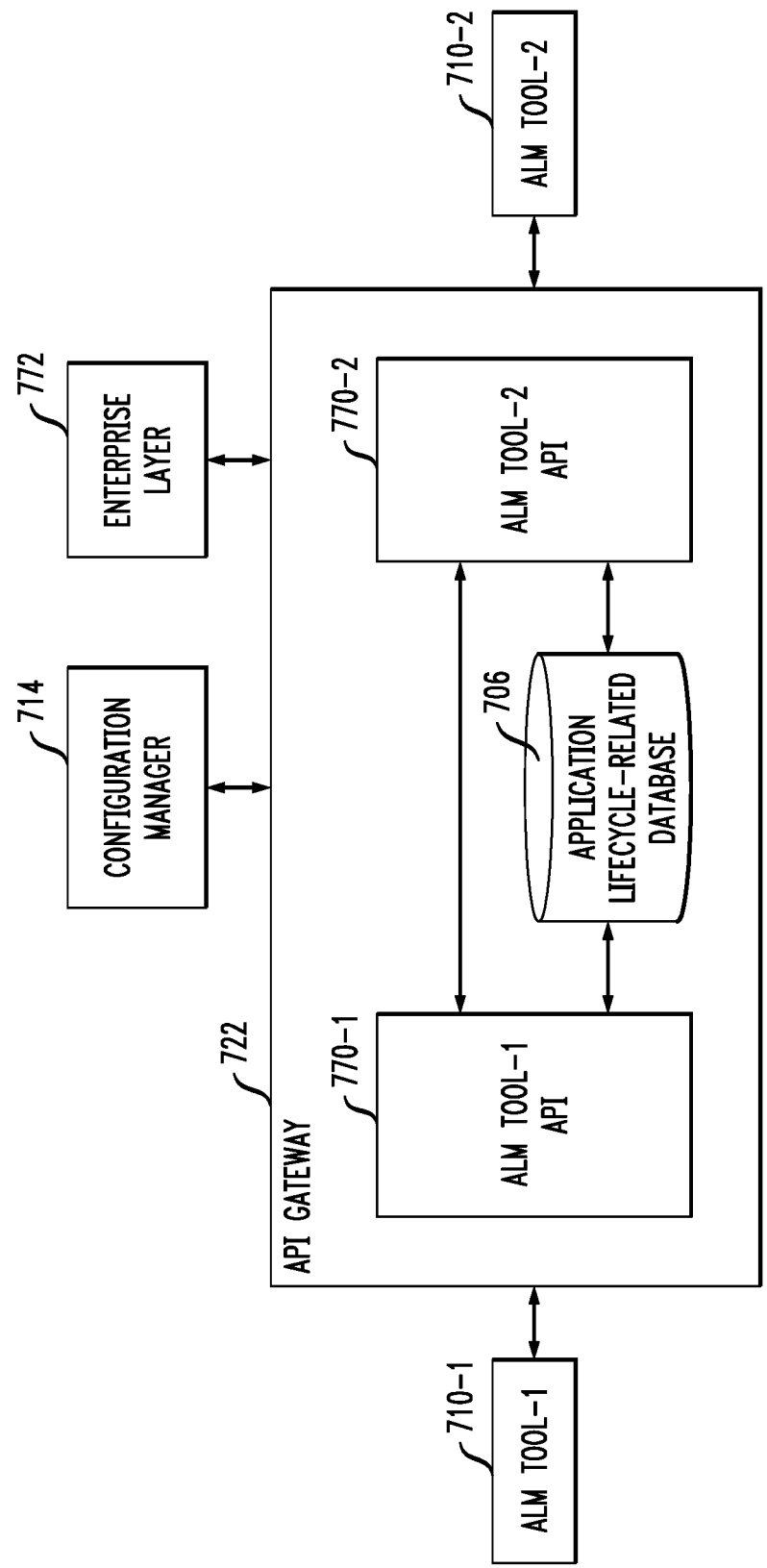

```
jira_instance.search_issues(search_parameters, start_idx, block_size,
fields=request_fields)
```

```
header = {"accept": "application/json", config('API_AUTH_KEY'):
config('API_AUTH_VAL'), "Content-Type": "application/json"} response = requests.post(url=JET_BASE_URL+'CreateJetRequest/',
data=jet_req_in_json, headers=header)
```

FIG. 10

```
if jet_check_flag:
    try:
        response = self.jet_access_requests.get_jet_details(jet_id)
        jet_response = json.loads(response.text)
        jet_details = jet_response.get('records')[0]
        transitions = self.cpg_jira.transitions(jira_request.key)
        if jira_request.fields.status.name.upper() == 'SKU/OPTION CREATED':
            # For Jet status(5. Send for Review) the text sends as 'Send for Approval'
            if str(jet_details.get('Status')) == 'Send for Approval':
                jira_jet_dic['Status'] = 'Approved'
                self.jet_access_requests.update_jet_values(jet_id, json.dumps(jira_jet_dic, indent=8))
        if str(jet_details.get('Status')) == 'Closed':
            for transition in transitions:
                if transition.get('id') == '9x' :#Cost Complete
                    self.cpg_jira.transition_issue(jira_request, '9x')
            #self.close_subtasks(jira_request)
        if str(jet_details.get('Status')) == 'Send for Approval':
            for transition in transitions:
                if transition.get('id') == '1xy' :#Submit for Review
                    self.cpg_jira.transition_issue(jira_request, '1xy')

state = jira_request.fields.status.name.upper()
        self.sync_comments(jira_request, jet_details, state)
        if state != 'CANCELLED':
            self.sync_attachments(jira_request, jet_details)

except Exception as e:
        error_msg = {'JIRA_ID': jira_request.key, 'JET_ID': jet_id,
            'ERROR': f'UPDATE_ERROR: {repr(e)}'}
        self.exceptions_per_cycle.amend(error_msg)
```

SYNCHRONIZATION SYSTEM FOR APPLICATION LIFECYCLE MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software development often requires coordination and/or collaboration across multiple resources. However, managing software development projects using conventional approaches can lead to data silos, collaboration challenges, and a lack of project visibility. Additionally, such conventional software development management approaches often lack the ability to synchronize among different tools and resolve conflicts arising across different tools, commonly resulting in errors and resource wastage.

SUMMARY

Illustrative embodiments of the disclosure provide techniques related to synchronization systems for application lifecycle management (ALM).

An exemplary computer-implemented method includes identifying two or more application lifecycle management tools in conjunction with at least one software application development task. The method also includes establishing a connection between at least a first of the two or more application lifecycle management tools and at least a second of the two or more application lifecycle management tools using one or more application programming interfaces associated with the at least a first application lifecycle management tool and one or more application programming interfaces associated with the at least a second application lifecycle management tool. Additionally, the method includes determining one or more data mapping rules and one or more data transformation rules associated with the at least a first application lifecycle management tool and the at least a second application lifecycle management tool. Further, the method also includes synchronizing data, related to the at least one software application development task, from the at least a first application lifecycle management tool to the at least a second application lifecycle management tool, via the connection and in accordance with at least a portion of the one or more data mapping rules and at least a portion of the one or more data transformation rules.

Illustrative embodiments can provide significant advantages relative to conventional software development management approaches. For example, problems associated with error-prone and resource-intensive approaches are overcome in one or more embodiments through automatically synchronizing data across multiple application lifecycle management tools using API-based connections.

These and other illustrative embodiments described herein include, without limitation, methods, apparatus, systems, and computer program products comprising processor-readable storage media.

BRIEF DESCRIPTION OF THE DRAWINGS

FIG. 5 shows an example mapping across a first ALM tool and a second ALM tool in an illustrative embodiment.

FIG. 6 shows example form field value mapping between a first ALM tool and a second ALM tool in an illustrative embodiment.

FIG. 7 shows example system architecture involving a configuration manager in an illustrative embodiment.

FIG. 8 shows example pseudocode for implementing a Jira application programming interface (API) in an illustrative embodiment.

FIG. 9 shows example pseudocode for implementing an API for creating and/or updating Jet requests in an illustrative embodiment.

FIG. 10 shows example pseudocode for update and synchronization operations in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
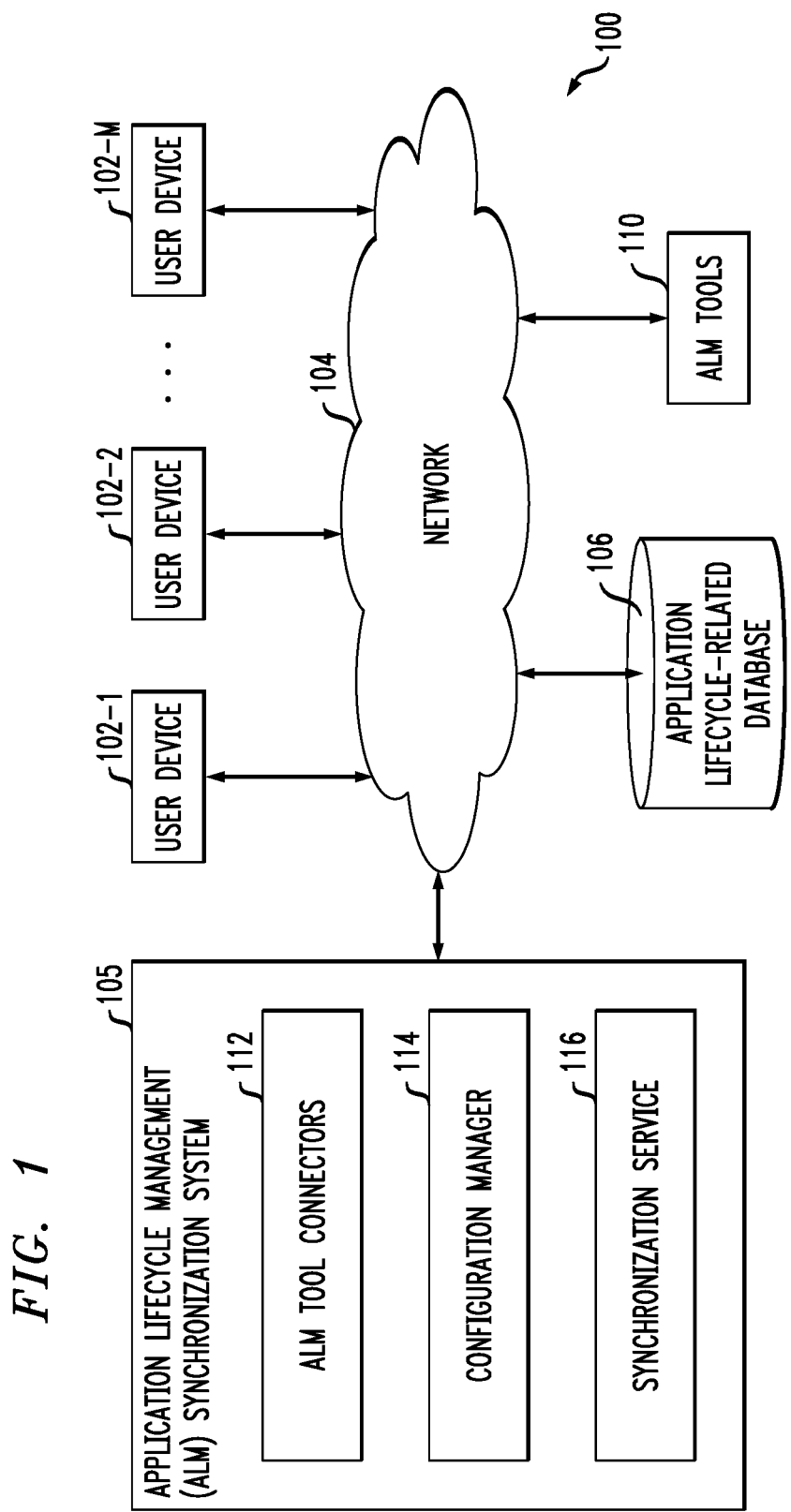
FIG. 1 shows an information processing system configured for implementing synchronization systems for ALM in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is ALM synchronization system 105 and ALM tools 110 (also referred to herein as project management software).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, ALM synchronization system 105 can have an associated application lifecycle-related database 106 configured to store data pertaining to software application information, ALM tool information, and/or software development information (e.g., issue data, temporal data, etc.).

The application lifecycle-related database 106 in the present embodiment is implemented using one or more storage systems associated with ALM synchronization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with ALM synchronization system 105 are one or more input-output devices, which illustratively comprise keyboards, displays or other types of input-output devices in any combination. Such input-output devices can be used, for example, to support one or more user interfaces to ALM synchronization system 105, as well as to support communication between ALM synchronization system 105 and other related systems and devices not explicitly shown.

Additionally, ALM synchronization system 105 in the FIG. 1 embodiment is assumed to be implemented using at least one processing device. Each such processing device generally comprises at least one processor and an associated memory, and implements one or more functional modules for controlling certain features of ALM synchronization system 105.

More particularly, ALM synchronization system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows ALM synchronization system 105 to communicate over the network 104 with the user devices 102, and illustratively comprises one or more conventional transceivers.

The ALM synchronization system 105 further comprises ALM tool connectors 112, configuration manager 114, and synchronization service 116.

It is to be appreciated that this particular arrangement of elements 112, 114 and 116 illustrated in the ALM synchronization system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for implementing synchronization systems for application lifecycle management involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of ALM synchronization system 105, application lifecycle-related database 106, and ALM tools 110 can be on and/or part of the same processing platform.

An exemplary process utilizing elements 112, 114 and 116 of an example ALM synchronization system 105 in computer network 100 will be described in more detail with reference to the flow diagram of FIG. 11.

Accordingly, at least one embodiment includes generating and/or implementing synchronization systems for ALM. Such an embodiment includes implementing a cross-tool synchronization system that allows users to onboard preferred ALM tools, configure synchronization settings, and monitor the synchronization process. One or more embodiments includes providing at least one interface that abstracts complexities of underlying ALM tool APIs, allowing users to establish bidirectional synchronization of project data.

As further detailed herein, one or more embodiments include generating and/or implementing a microservices architecture comprising components including at least one user interface, at least one API gateway, at least one core synchronization service, one or more connectors for each supported ALM tool, and at least one configuration management module. Such an embodiment includes leveraging one or more APIs, one or more data mapping techniques, and transformation logic to ensure consistency and real-time synchronization of data across ALM tools. Additionally, error handling techniques, logging techniques, and one or more monitoring mechanisms can be incorporated to provide visibility and troubleshooting for synchronization issues.

By way of illustration, consider an example scenario for a given enterprise wherein a flow of information goes from a server engineering team using ALM tools (also referred to as project management software) such as, for example, Jira, to digital support product data tools using Team Foundation Server (TFS), to an operations team using a customer relationship management (CRM) platform, to a validation team using Jira. At least one embodiment can be implemented in connection with such an example scenario, facilitating one or more functionalities and/or one or more benefits as detailed herein.

Figure 2:
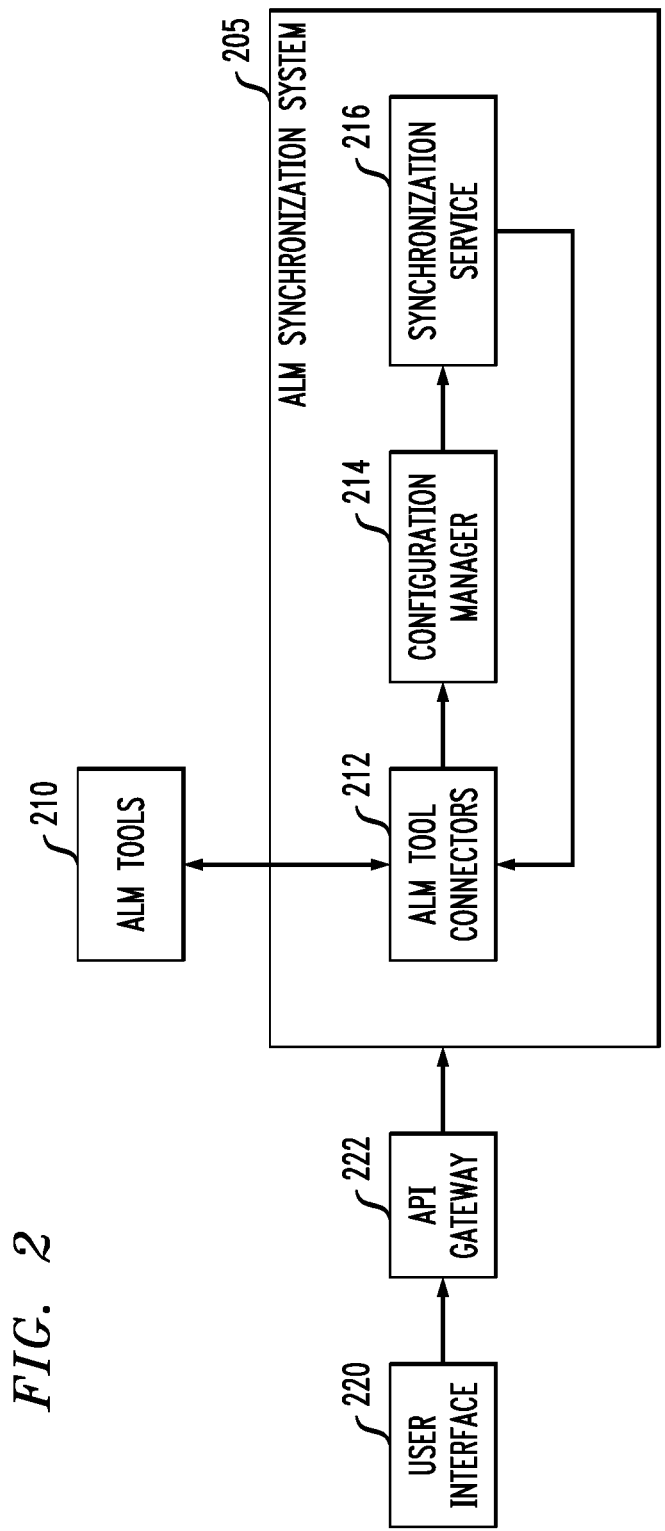
FIG. 2 shows example software as a service-based (SaaS-based) system architecture in an illustrative embodiment.

FIG. 2 shows example SaaS-based system architecture in an illustrative embodiment. By way of illustration, FIG. 2 depicts ALM synchronization system 205, which, in one or more embodiments, comprises a SaaS-based system that enables users to onboard and manage different ALM tools using at least one web-based interface. For example, as depicted in FIG. 2, such an embodiment can include implementing a microservices architecture comprising a user interface 220 and an API gateway 222, along with elements of the ALM synchronization system 205 including ALM tool connectors 212, a configuration manager 214, and a synchronization service 216. At least one embodiment can also optionally include an observability and monitoring tool (not depicted in FIG. 2). The user interface 220 can include a web-based user interface wherein users can onboard ALM tools 210, configure synchronization settings, and monitor a synchronization process. The API gateway 222 can include a centralized entry point for all users and/or synchronizations requests, and the API gateway 222 can route requests to the appropriate ALM tool connectors (among ALM tool connectors 212) and/or ALM tool(s) (among ALM tools 210) based at least in part on the configuration settings.

Also, the ALM tool connectors 212 include developed wrappers to interact with ALM tools 210 using corresponding APIs. As used herein, a wrapper refers to a software component and/or layer that encapsulates and/or simplifies interactions with at least one ALM tool's API(s). Accordingly, a wrapper can serve as an intermediary that provides a user-friendly and/or abstracted interface for users (e.g., developers) and/or applications to communicate with the at least one ALM tool's functionality. In one or more embodiments, the ALM tool connectors 212 are responsible for authenticating with ALM tool APIs, performing create, read, update, and delete (CRUD) operations, and transforming data between the ALM tool API's format and an internal representation for synchronization. The configuration manager 214 allows users to create and store configurations, manage mapping rules between different ALM tools, and define specific transformation rules. The synchronization service 216 includes a synchronization mechanism that periodically polls the ALM tools 210 for updates and propagates changes between the ALM tools 210.

Additionally, in at least one embodiment, the synchronization service 216 can use the configuration manager 214 to determine the mapping and transformation rules for each ALM tool. Further, in such an embodiment, an algorithm implemented by the synchronization service 216 can involve the following steps: fetch updates from a source ALM tool (from among ALM tools 210) using the appropriate ALM tool connector (from among ALM tool connectors 212); apply any required transformations based on configuration manager 214 rule(s); use the ALM tool connector (from among ALM tool connectors 212) for a target ALM tool (from among ALM tools 210) to create and/or update the corresponding records; and track and handle conflicts and/or inconsistencies during synchronization.

Also, as noted above, in at least one embodiment, an observability and monitoring tool can encompass an integration of observability and monitoring mechanisms to track the system's performance and detect one or more issues. Such a tool can include using logging techniques and metrics to monitor the data transfer and synchronization process. The tool can additionally include implementing error handling and notification capabilities to alert, for example, administrators in the case of failures and/or anomalies.

Figure 3:
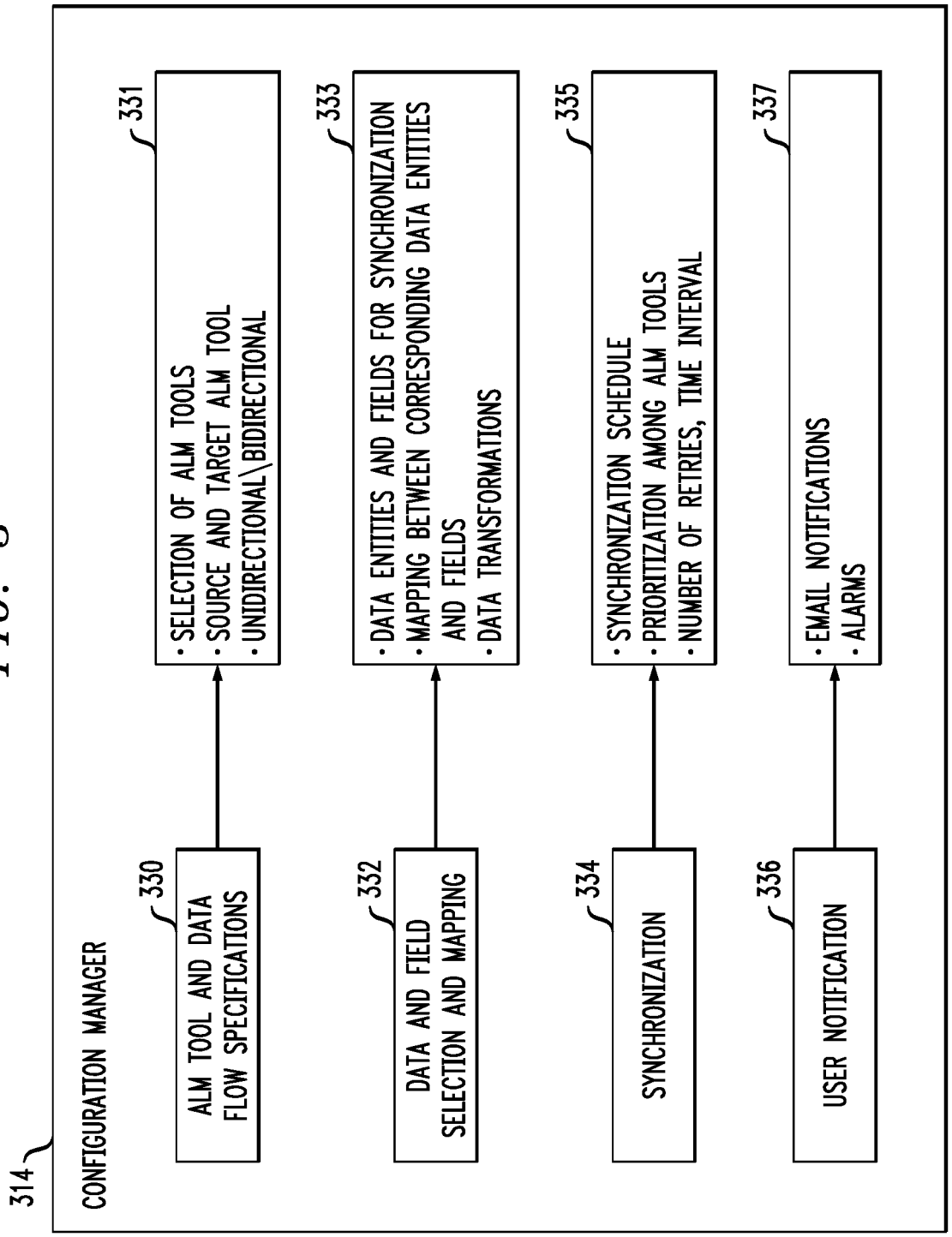
FIG. 3 shows an example configuration manager workflow in an illustrative embodiment.

FIG. 3 shows an example workflow carried out by configuration manager 314 in an illustrative embodiment. By way of illustration, FIG. 3 depicts configuration manager 314 synchronizing data between ALM tools and/or systems facilitates and managing the synchronization process. The configuration manager 314 can utilize, for example, a configuration file which facilitates specification of the details of ALM tools, including their uniform resource locators (URLs). Such a configuration file can include sections and/or properties dedicated to each ALM tool, including relevant information such as the tool's name, the tool's URL, etc.

Referring again to FIG. 3, in step 330, the configuration manager 314 implements ALM tool and data flow specifications. For a unidirectional data flow, the configuration manager 314, as indicated in step 331, defines the source ALM tool and the target ALM tool, and specifies that data flows only from the source tool to the target tool. For a bidirectional data flow, as also indicated in step 331, the configuration manager 314 defines both the source and target ALM tools, allowing data to flow in both directions between the tools.

Additionally, in step 332, the configuration manager 314 implements data and field selection and mapping for unidirectional and/or bidirectional updates. As indicated in step 333, for unidirectional updates, the configuration manager 314 specifies the specific data entities and/or objects that need to be synchronized from the source ALM tool to the target ALM tool, by selecting the relevant fields within those entities and/or objects that should be updated in the target system. For bidirectional updates, as also indicated in step 333, the configuration manager 314 selects the data entities and fields for synchronization in both directions, ensuring consistency between the ALM tools.

As also noted above in connection with step 332, the configuration manager 314 can also implement data and field mapping. In one or more embodiments, and as indicated in step 333, implementing data and field mapping includes defining a mapping between corresponding data entities and fields in the source and target ALM tools. Such mapping ensures that data from the source system is correctly mapped and updated in the corresponding fields of the target system. Also, as indicated in step 333, the configuration manager 314 can configure one or more data transformations. If data in the source ALM tool needs to be transformed and/or converted before updating the target ALM tool, the configuration manager 314 configures the necessary data transformations, which may include data type conversions, value mappings, and/or data formatting to match the target system's requirements.

Further, step 334 includes the configuration manager 314 performing one or more synchronization operations between the source ALM tool and the target ALM tool. As indicated in step 335, this can involve the configuration manager generating and/or implementing a synchronization schedule, which includes configuring the schedule and frequency of synchronization between and/or across systems. In one or more embodiments, such synchronization operations can also include the configuration manager 314 prioritizing ALM tools in the case of two or more ALM tools being updated at the same time. Such an embodiment can include defining, using the configuration manager 314, one or more rules and/or policies that determine which tool's updates should take precedence in relation to one or more other tools. Such a determination can be based at least in part on factors such as, e.g., enterprise requirements, data dependencies, and/or system performance. Further, as also indicated in step 335, one or more embodiments can include the configuration manager 314 specifying the number of retries in case of a synchronization failure. Such an embodiment can include configuring the configuration manager to automatically retry failed synchronization attempts a certain number of times, as well as defining one or more appropriate time intervals between retries to allow for recovery and/or issue resolution.

Referring again to FIG. 3, step 336 includes the configuration manager 314 outputting and/or sending of notifications to one or more specified users in the case of errors and/or specific events. As indicated in step 337, these user notification actions can include setting-up alerts and/or for situations such as, for example, ALM unavailability, downtime, field availability issues, etc., as well as incorporating error codes and/or messages to provide detailed information (e.g., via email notifications to users) about the errors.

In at least one embodiment, an API pull mechanism can be implemented to provide control over the synchronization process and reduce the risk of data inconsistencies. Such an API pull mechanism can retrieve and synchronize data based at least in part on one or more specific rules and logic, ensuring a more reliable and flexible synchronization between ALM tools.

Also, with respect to determining the scope of synchronization (e.g., querying the relevant data), the fields which are subject to synchronization can be configured using features of the configuration manager including, e.g., incremental synchronization and data relevance. Accordingly, one or more embodiments can include implementing an incremental synchronization approach wherein only new or data modified since the last synchronization is queried, an approach which can reduce the amount of data queried and improve efficiency. Additionally, the configuration manager can consider the relevance of the data to be synchronized, and configuration manager will query only data, e.g., that has changed or is required for synchronization, rather than retrieving an entire dataset.

Figure 4:
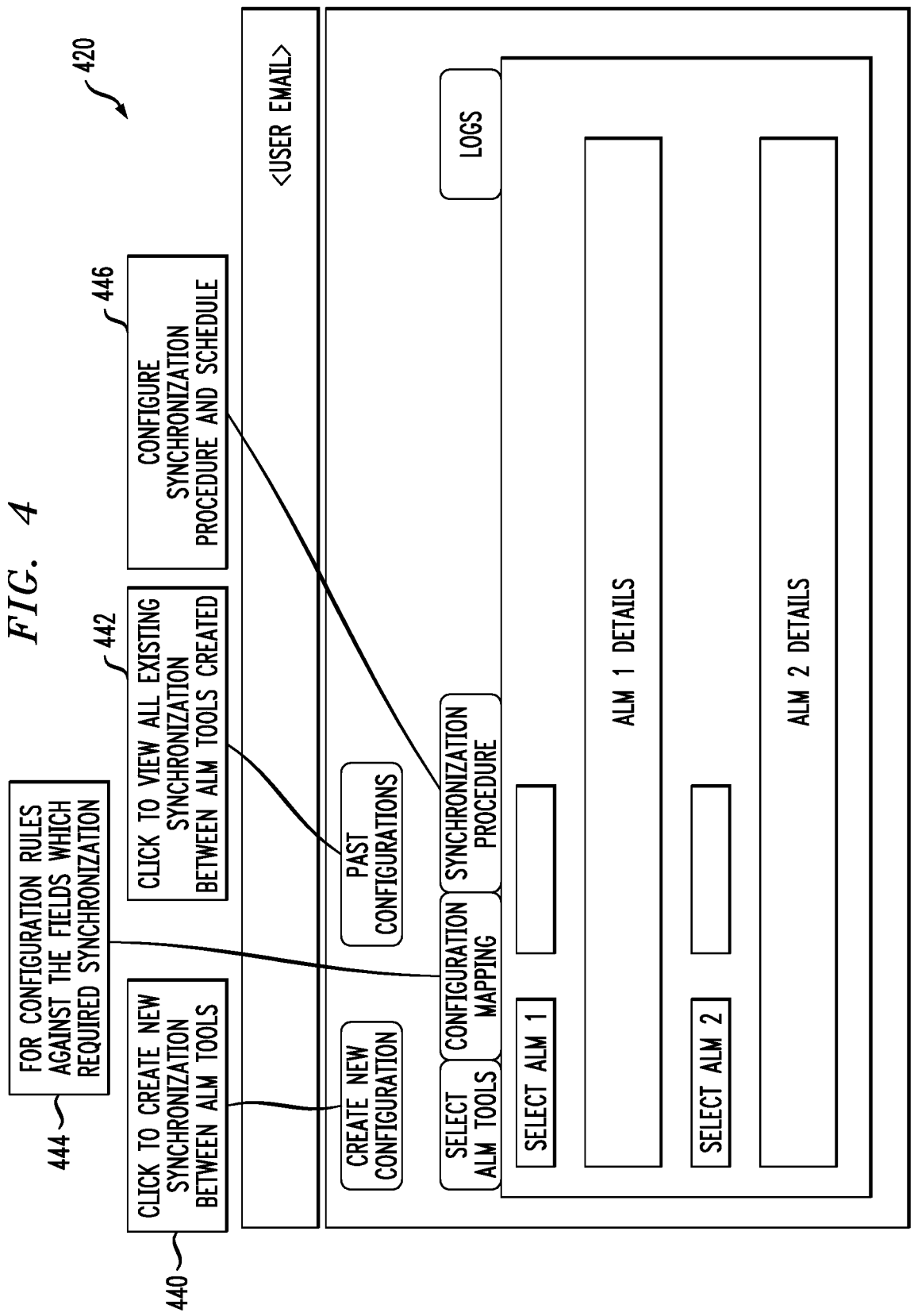
FIG. 4 shows an example user interface in an illustrative embodiment.

FIG. 4 shows an example user interface 420 in an illustrative embodiment. By way of illustration, example user interface 420 includes element 440, which can be clicked and/or selected to create a new synchronization between ALM tools. Also, example user interface 420 includes element 442, which can be clicked and/or selected to view all existing synchronizations between ALM tools created within at least one given temporal period. Additionally, example user interface 420 includes element 444, which can be clicked and/or selected to view configuration rules against fields which require (d) synchronization. Further, example user interface 420 includes element 446, which can be clicked and/or selected to configure at least one synchronization procedure and/or schedule.

As detailed herein, one or more embodiments include providing a SaaS-based system that enables users to onboard different ALM tools by registering corresponding APIs and configuring synchronization operations with the help of a web-based interface and one or more configuration settings. Also, such an embodiment can include configuration mapping, which can include, for example, a mapping workflow between a first ALM tool and a second ALM tool.

FIG. 5 shows an example mapping across a first ALM tool (e.g., Jira) and a second ALM tool (e.g., Jet) in an illustrative embodiment. By way of illustration, table 500 displays an example mapping of fields for ALM Tool-1 and ALM Tool-2 that should be updated with a given and/or scheduled synchronization.

Additionally, one or more embodiments include implementing a synchronization service which can use, for example, create and/or update APIs for different ALM tools to perform synchronizations.

FIG. 6 shows example form field value mapping between a first ALM tool (e.g., Jira) and a second ALM tool (e.g., Jet) in an illustrative embodiment. By way of illustration, table 600 displays an example mapping of form field values mapping between for ALM Tool-1 and ALM Tool-2. Additionally, in table 600, the default column includes values that represent implied selection under a given scenario, applied by the synchronization system. For example, such default values can be utilized in situations such as when ALM Tool-1 does not have an equivalent field in ALM Tool-2, or vice versa, when a field is mandatory in ALM Tool-1 but is not in ALM Tool-2, or vice versa, and/or if a particular selection is implied.

Also, at least one embodiment can include form field value mapping between ALM tools. For example, the value given in a column for a first AML tool (e.g., Jira) can be updated to a value associated with a second AML tool (e.g., JET) by a synchronization service. If a default value is updated against any column, then the default value will be selected. A synchronization service, as noted above, can include using create and/or update APIs associated with the first AML tool and the second AML tool to perform this synchronization.

Additionally, in one or more embodiments, once a synchronization task is configured, at least one user can initiate the synchronization using an interface.

FIG. 7 shows example system architecture involving a configuration manager in an illustrative embodiment. By way of illustration, FIG. 7 depicts configuration manager 714, which includes a synchronization scheduler component, interacting with API gateway 722. API gateway 722 includes an API for ALM Tool-1 (e.g., Jira) 770-1, an API for ALM Tool-2 (e.g., Jet) 770-2, and application lifecycle-related database 706. Additionally, based at least in part on inputs from configuration manager 714 and actions carried out via API 770-1 and API 770-2, API gateway 722 can interact with and perform synchronization operations across ALM Tool-1 710-1 and ALM Tool-2 710-2. Additionally, FIG. 7 depicts data transfers, through API requests and responses, across configuration manager 714, API gateway 722, ALM Tool-1 770-1, and ALM Tool-2 770-2. Further, as illustrated in FIG. 7, element 772 represents an enterprise layer comprising ALM tools API information and at least one synchronization system database.

Accordingly, as detailed herein, one or more embodiments include generating and/or implementing a scalable SaaS-based application to automate data flows between ALM tools (e.g., between Jira and Jet applications) to increase efficiency and reduce and/or avoid human errors. Such an embodiment includes identifying the ALM tools involved in a given use case, analyzing the data models for the identified ALM tools (e.g., one or more Jira workflows and one or more Jet workflows), creating data mapping(s) between the identified ALM tools, preparing the configuration settings for the identified ALM tools, and selecting at least one synchronization process to be implemented for the identified ALM tools.

Also, in such an embodiment, at least one user interface can be implemented to ready the connectors for the identified ALM tools. Readying the connectors can include, for example, implementing ALM tool-specific APIs to securely connect the identified ALM tools, to perform one or more CRUD operations in connection with at least one of the identified ALM tools, and to perform the synchronization across and/or among the identified ALM tools based at least in part on the prepared configuration setting(s) and the selected synchronization process.

In at least one embodiment, an algorithm for such a synchronization process can include, for example, identifying a list of one or more issues associated with a first ALM tool (e.g., Jira) for which a second ALM tool (e.g., Jet) is to be implemented. Additionally, such an embodiment includes identifying a list of one or more issues associated with the first ALM tool that need to be updated and synchronized across the second ALM tool. For the list of one or more issues associated with the first ALM tool for which at least one case is to be created using the second ALM tool, such an embodiment includes creating the at least one case for the second ALM tool, persisting mapping in a field associated with the first ALM tool and at least one database, and adding at least one reference comment associated with information pertaining to the one or more issues associated with the first ALM. Persisting mapping, as noted above, refers to saving and/or storing issue identifier information pertaining to a first ALM tool, along with the corresponding issue identifier information pertaining to a second ALM tool, in a database for reference. Also, this mapping information can be saved and/or stored in one of the fields in the ALM tools. Further, as noted above, a reference comment refers to mapping information being saved and/or stored in the form of a comment in the ALM tool(s).

Additionally, for the list of one or more issues associated with the first ALM tool to be updated and synchronized across the second ALM tool, such an embodiment includes synchronizing status information, synchronizing one or more related comments, and synchronizing one or more related attachments. By way merely of example, FIG. 5 depicts an example of how various status information in two ALM tools are synchronized. Also, in one or more embodiments, the ALM tools can include a provision for adding comments and/or attachments in connection with issues, and as such, those comments and/or attachments can also be synchronized between ALM tools.

As further detailed herein, one or more embodiments include generating and/or implementing connectors which can include, for example, using exposed APIs (e.g., representational state transfer (REST) APIs) associated with ALM tools (e.g., the first ALM tool and the second ALM tool noted in the above example embodiment) to connect and synchronize between the ALM tools and/or systems. FIG. 8 and FIG. 9 are examples of APIs used within one or more connectors.

FIG. 8 shows example pseudocode for implementing a Jira API in an illustrative embodiment. In this embodiment, example pseudocode 800 is executed by or under the control of at least one processing system and/or device. For example, the example pseudocode 800 may be viewed as comprising a portion of a software implementation of at least part of ALM synchronization system 105 of the FIG. 1 embodiment.

The example pseudocode 800 illustrates initializing a Jira instance with respect to searching issues, wherein search parameters comprise a query specifying the project, issue type, status, etc. Request fields hold the required fields that need to be synchronized with another system (e.g., key, comment, attachment, status, description, custom fields, etc.).

It is to be appreciated that this particular example pseudocode shows just one example implementation of a Jira API, and alternative implementations can be used in other embodiments.

FIG. 9 shows example pseudocode for implementing an API for creating and/or updating Jet requests in an illustrative embodiment. In this embodiment, example pseudocode 900 is executed by or under the control of at least one processing system and/or device. For example, the example pseudocode 900 may be viewed as comprising a portion of a software implementation of at least part of ALM synchronization system 105 of the FIG. 1 embodiment.

The example pseudocode 900 illustrates a call being made to a Jet URL for creating a request with headers containing the format, content type, authentication details and the data in JavaScript object notation (JSON) format to create a Jet request.

It is to be appreciated that this particular example pseudocode shows just one example implementation of an API for creating and/or updating Jet requests, and alternative implementations can be used in other embodiments.

FIG. 10 shows example pseudocode for update and synchronization operations in an illustrative embodiment. In this embodiment, example pseudocode 1000 is executed by or under the control of at least one processing system and/or device. For example, the example pseudocode 1000 may be viewed as comprising a portion of a software implementation of at least part of ALM synchronization system 105 of the FIG. 1 embodiment.

The example pseudocode 1000 in part addresses challenges of data fragmentation, duplication, inconsistency, collaboration, workflow misalignment, and reporting faced by development teams using different ALM tools. For instance, example pseudocode 1000 includes promoting improved coordination, efficiency, and visibility across teams, ultimately enhancing productivity and streamlining the development process. Such items represent example use cases which are illustrated through example pseudocode 1000 to demonstrate the feasibility of synchronization. Specifically, such example use cases include checking for a Jira issue status and updating the status of a corresponding Jet issue accordingly (and vice versa), synchronizing comments between Jira and Jet, and synchronizing attachments between Jira and Jet when the status is other than cancelled.

It is to be appreciated that this particular example pseudocode shows just one example implementation of update and synchronization operations, and alternative implementations can be used in other embodiments.

Accordingly, as detailed herein, one or more embodiments include implementing an ALM tool-agnostic approach for ALM tool synchronization. Such an embodiment includes using the APIs for given ALM tools and allowing users to synchronize data across multiple ALM tools of their choice. For example, at least one embodiment includes enabling user configuration management and onboarding by providing at least one SaaS-based interface that enables users to onboard ALM tools and configure synchronization settings. This self-service capability empowers users to define mappings, transformations, and/or synchronization rule management without requiring extensive programming or technical expertise.

Such an embodiment also includes enabling flexibility in data mapping and transformation by providing at least one data mapping and transformation mechanism capable of handling variations in data structures and formats across different ALM tools. The at least one mechanism allows users to define and customize data mappings, ensuring seamless synchronization of data between ALM tools with different entity models, fields, and/or relationships. Additionally, such an embodiment can provide extensibility and integration capabilities, enabling future integrations with additional ALM tools and/or expansion into one or more additional areas of software development lifecycles.

Figure 11:
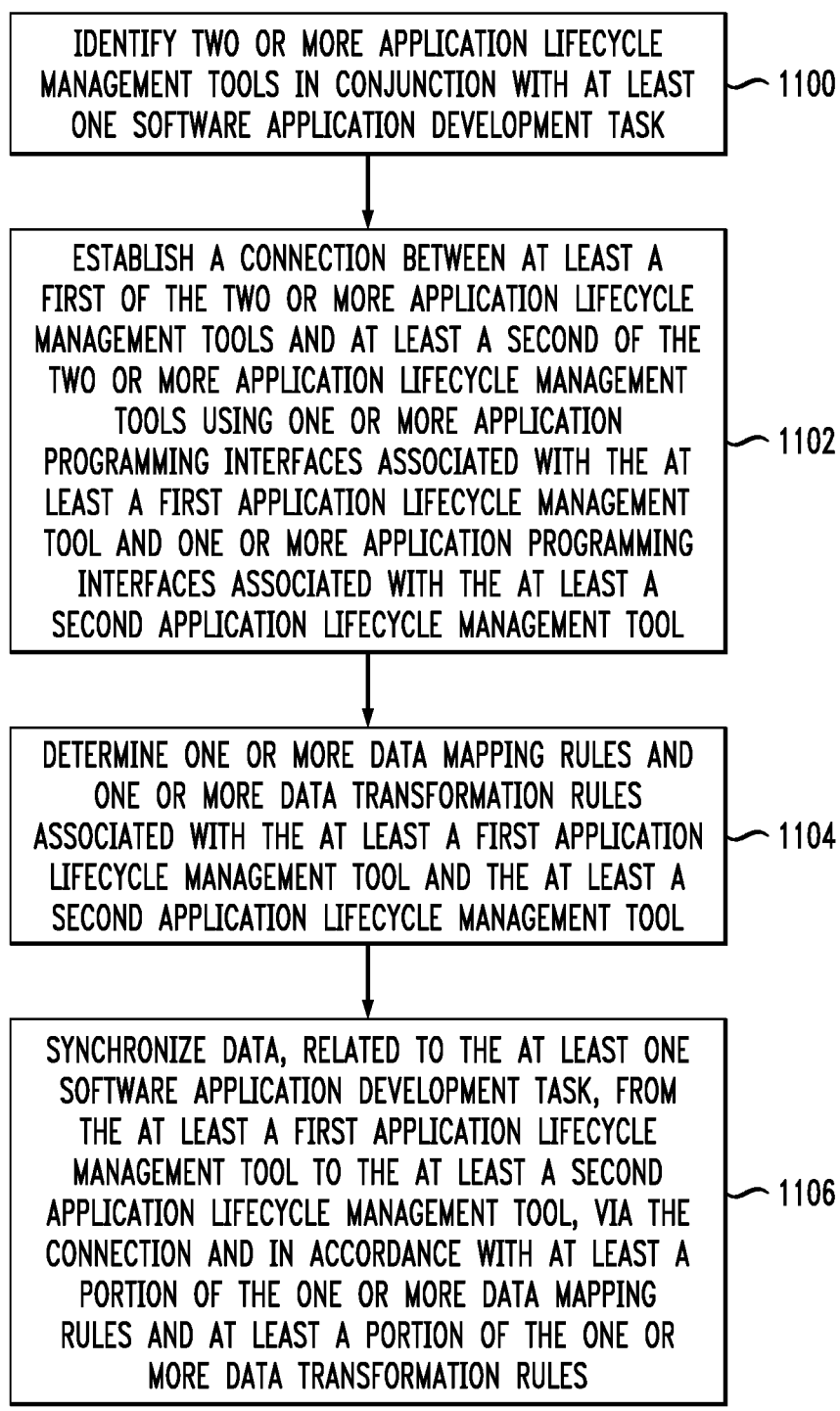
FIG. 11 is a flow diagram of a process for implementing synchronization systems for ALM in an illustrative embodiment.

FIG. 11 is a flow diagram of a process for implementing synchronization systems for application lifecycle management in an illustrative embodiment. It is to be understood that this particular process is only an example, and additional or alternative processes can be carried out in other embodiments.

In this embodiment, the process includes steps 1100 through 1106. These steps are assumed to be performed by ALM synchronization system 105 utilizing elements 112, 114 and 116.

Step 1100 includes identifying two or more application lifecycle management tools in conjunction with at least one software application development task. In at least one embodiment, identifying two or more application lifecycle management tools includes processing input information pertaining to application lifecycle management tools from at least one user associated with the at least one software application development task using at least one web-based interface.

Step 1102 includes establishing a connection between at least a first of the two or more application lifecycle management tools and at least a second of the two or more application lifecycle management tools using one or more application programming interfaces associated with the at least a first application lifecycle management tool and one or more application programming interfaces associated with the at least a second application lifecycle management tool. As used herein, a "connection" is to be broadly construed as a link or other mechanism that at least temporarily supports a communication path and/or interaction between components (e.g., two application lifecycle management tools). In one or more embodiments, establishing the connection includes authenticating the one or more application programming interfaces associated with the at least a first application lifecycle management tool and the one or more application programming interfaces associated with the at least a second application lifecycle management tool.

Step 1104 includes determining one or more data mapping rules and one or more data transformation rules associated with the at least a first application lifecycle management tool and the at least a second application lifecycle management tool. In at least one embodiment, determining one or more data mapping rules and one or more data transformation rules includes analyzing data models associated with the at least a first application lifecycle management tool and the at least a second application lifecycle management tool.

Step 1106 includes synchronizing data, related to the at least one software application development task, from the at least a first application lifecycle management tool to the at least a second application lifecycle management tool, via the connection and in accordance with at least a portion of the one or more data mapping rules and at least a portion of the one or more data transformation rules. In one or more embodiments, synchronizing data includes transforming, in accordance with the one or more data transformation rules, at least a portion of the data from a first format associated with the at least a first application lifecycle management tool to at least a second format. Additionally or alternatively, synchronizing data can include creating one or more data records for the at least a second application lifecycle management tool, wherein the one or more data records correspond to at least a portion of the data being synchronized. Also, in at least one embodiment, synchronizing data includes fetching one or more updates from the at least a first application lifecycle management tool using the one or more application programming interfaces associated with the at least a first application lifecycle management tool.

The techniques depicted in FIG. 11 can also include enabling monitoring, by at least one user associated with the at least one software application development task, of the synchronizing of the data using one or more logging techniques and one or more metrics. Additionally or alternatively, the techniques depicted in FIG. 11 can include generating and outputting one or more notifications, pertaining to at least one of one or more data synchronization errors and one or more data synchronization anomalies, to at least one user associated with the at least one software application development task.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement synchronization systems for application lifecycle management. These and other embodiments can effectively overcome problems associated with error-prone and resource-intensive approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
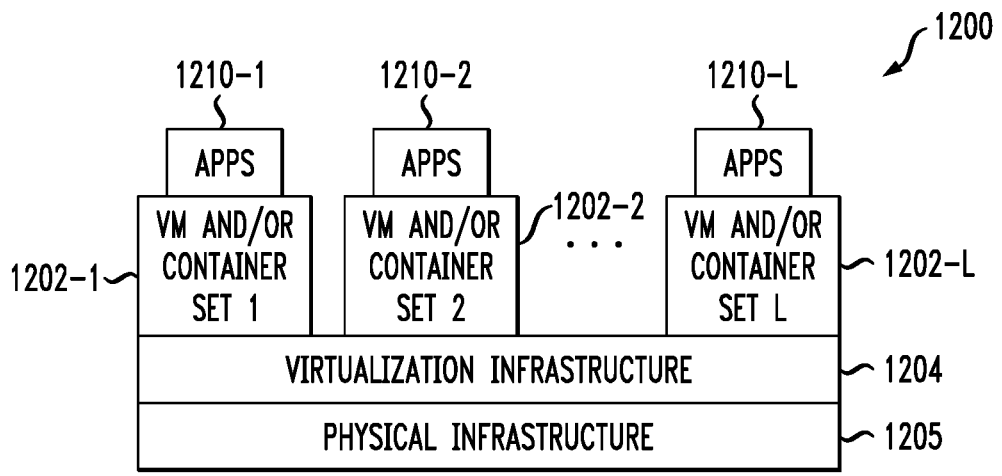
FIGS. 12 and 13 show examples of processing platforms that may be utilized to implement at least a portion of an information processing system in illustrative embodiments.
Figure 13:
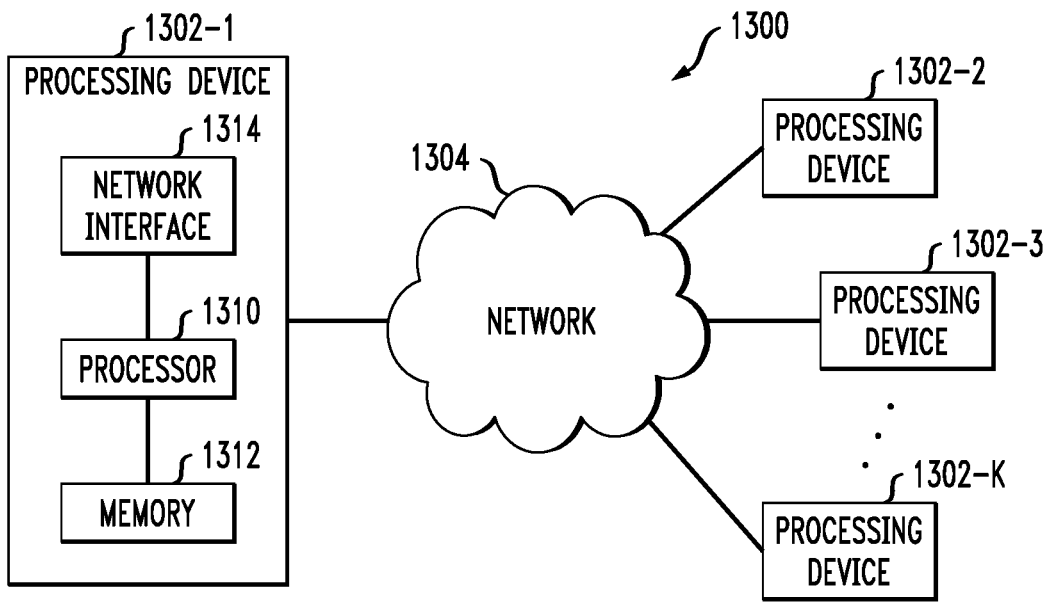

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more information processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a CPU, a GPU, a TPU, a microcontroller, an ASIC, a FPGA or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    identifying two or more application lifecycle management tools in conjunction with at least one software application development task;
    establishing a connection between at least a first of the two or more application lifecycle management tools and at least a second of the two or more application lifecycle management tools using one or more application programming interfaces associated with the at least first application lifecycle management tool and one or more application programming interfaces associated with the at least second application lifecycle management tool;
    determining one or more data mapping rules and one or more data transformation rules associated with the at least first application lifecycle management tool and the at least second application lifecycle management tool; and
    synchronizing data, related to the at least one software application development task, from the at least first application lifecycle management tool to the at least second application lifecycle management tool, via the connection and in accordance with at least a portion of the one or more data mapping rules and at least a portion of the one or more data transformation rules, wherein synchronizing the data related to the at least one software application development task comprises transforming, in accordance with the one or more data transformation rules, at least a portion of the data from a format associated with the at least first application lifecycle management tool to a data representation designated for one or more synchronization operations;
    wherein the computer-implemented method is performed by at least one processing device comprising a processor coupled to a memory.

2. The computer-implemented method of claim 1, wherein synchronizing the data comprises creating one or more data records for the at least second application lifecycle management tool, wherein the one or more data records correspond to at least a portion of the data being synchronized.

3. The computer-implemented method of claim 1, wherein identifying the two or more application lifecycle management tools comprises processing input information pertaining to application lifecycle management tools from at least one user associated with the at least one software application development task using at least one web-based interface.

4. The computer-implemented method of claim 1, wherein establishing the connection comprises authenticating the one or more application programming interfaces associated with the at least first application lifecycle management tool and the one or more application programming interfaces associated with the at least second application lifecycle management tool.

5. The computer-implemented method of claim 1, wherein determining the one or more data mapping rules and one or more data transformation rules comprises analyzing data models associated with the at least first application lifecycle management tool and the at least second application lifecycle management tool.

6. The computer-implemented method of claim 1, wherein synchronizing the data comprises fetching one or more updates from the at least first application lifecycle management tool using the one or more application programming interfaces associated with the at least first application lifecycle management tool.

7. The computer-implemented method of claim 1, further comprising:
    enabling monitoring, by at least one user associated with the at least one software application development task, of the synchronizing of the data using one or more logging techniques and one or more metrics.

8. The computer-implemented method of claim 1, further comprising:
generating and outputting one or more notifications, pertaining to at least one of one or more data synchronization errors and one or more data synchronization anomalies, to at least one user associated with the at least one software application development task.

9. A non-transitory processor-readable storage medium having stored therein program code of one or more software programs, wherein the program code when executed by at least one processing device causes the at least one processing device:
to identify two or more application lifecycle management tools in conjunction with at least one software application development task;
to establish a connection between at least a first of the two or more application lifecycle management tools and at least a second of the two or more application lifecycle management tools using one or more application programming interfaces associated with the at least first application lifecycle management tool and one or more application programming interfaces associated with the at least second application lifecycle management tool;
to determine one or more data mapping rules and one or more data transformation rules associated with the at least first application lifecycle management tool and the at least second application lifecycle management tool; and
to synchronize data, related to the at least one software application development task, from the at least first application lifecycle management tool to the at least second application lifecycle management tool, via the connection and in accordance with at least a portion of the one or more data mapping rules and at least a portion of the one or more data transformation rules, wherein synchronizing the data related to the at least one software application development task comprises transforming, in accordance with the one or more data transformation rules, at least a portion of the data from a format associated with the at least first application lifecycle management tool to a data representation designated for one or more synchronization operations.

10. The non-transitory processor-readable storage medium of claim 9, wherein synchronizing the data comprises creating one or more data records for the at least second application lifecycle management tool, wherein the one or more data records correspond to at least a portion of the data being synchronized.

11. The non-transitory processor-readable storage medium of claim 9, wherein identifying the two or more application lifecycle management tools comprises processing input information pertaining to application lifecycle management tools from at least one user associated with the at least one software application development task using at least one web-based interface.

12. The non-transitory processor-readable storage medium of claim 9, wherein establishing the connection comprises authenticating the one or more application programming interfaces associated with the at least first application lifecycle management tool and the one or more application programming interfaces associated with the at least second application lifecycle management tool.

13. The non-transitory processor-readable storage medium of claim 9, wherein determining the one or more data mapping rules and one or more data transformation rules comprises analyzing data models associated with the at least first application lifecycle management tool and the at least second application lifecycle management tool.

14. The non-transitory processor-readable storage medium of claim 9, wherein determining the one or more data mapping rules and one or more data transformation rules comprises analyzing data models associated with the at least first application lifecycle management tool and the at least second application lifecycle management tool.

15. An apparatus comprising:
at least one processing device comprising a processor coupled to a memory;
the at least one processing device being configured:
to identify two or more application lifecycle management tools in conjunction with at least one software application development task;
to establish a connection between at least a first of the two or more application lifecycle management tools and at least a second of the two or more application lifecycle management tools using one or more application programming interfaces associated with the at least first application lifecycle management tool and one or more application programming interfaces associated with the at least second application lifecycle management tool;
to determine one or more data mapping rules and one or more data transformation rules associated with the at least first application lifecycle management tool and the at least second application lifecycle management tool; and
to synchronize data, related to the at least one software application development task, from the at least first application lifecycle management tool to the at least second application lifecycle management tool, via the connection and in accordance with at least a portion of the one or more data mapping rules and at least a portion of the one or more data transformation rules, wherein synchronizing the data related to the at least one software application development task comprises transforming, in accordance with the one or more data transformation rules, at least a portion of the data from a format associated with the at least first application lifecycle management tool to a data representation designated for one or more synchronization operations.

16. The apparatus of claim 15, wherein synchronizing the data comprises creating one or more data records for the at least second application lifecycle management tool, wherein the one or more data records correspond to at least a portion of the data being synchronized.

17. The apparatus of claim 15, wherein identifying the two or more application lifecycle management tools comprises processing input information pertaining to application lifecycle management tools from at least one user associated with the at least one software application development task using at least one web-based interface.

18. The apparatus of claim 15, wherein establishing the connection comprises authenticating the one or more application programming interfaces associated with the at least first application lifecycle management tool and the one or more application programming interfaces associated with the at least second application lifecycle management tool.

19. The apparatus of claim 15, wherein determining the one or more data mapping rules and one or more data transformation rules comprises analyzing data models associated with the at least first application lifecycle management tool and the at least second application lifecycle management tool.

20. The apparatus of claim 15, wherein synchronizing the data comprises fetching one or more updates from the at least first application lifecycle management tool using the one or more application programming interfaces associated with the at least first application lifecycle management tool.

\* \* \* \* \*